United States Patent [19]

Shirakihara

[11] Patent Number: 5,600,596
[45] Date of Patent: Feb. 4, 1997

[54] DATA ACCESS SCHEME WITH SIMPLIFIED FAST DATA WRITING

[75] Inventor: Toshio Shirakihara, Kanagawa-ken, Japan

[73] Assignee: Kabushiki Kaisha Toshiba, Kawasaki, Japan

[21] Appl. No.: 365,143

[22] Filed: Dec. 28, 1994

[30] Foreign Application Priority Data

Dec. 28, 1993 [JP] Japan ..................................... 5-349336

[51] Int. Cl.⁶ ...................................................... G06F 13/00
[52] U.S. Cl. ............................... 365/189.01; 365/189.05; 395/474; 395/479; 395/404
[58] Field of Search .......................... 365/230.01, 189.01, 365/189.05; 395/275, 400, 425, 474, 404, 479

[56] References Cited

U.S. PATENT DOCUMENTS 5,170,466  12/1992  Rogan et al. ........................... 395/145
5,313,585  5/1994  Jeffries et al. ........................... 395/275

FOREIGN PATENT DOCUMENTS 62-97023  5/1987  Japan .

OTHER PUBLICATIONS

Rosenblum et al., "The Design and Implementation of a Log–Structured File System", Proceedings of the 13th ACM, (1991), pp. 1–15.

Primary Examiner—Viet Q. Nguyen
Attorney, Agent, or Firm—Foley & Lardner

[57] ABSTRACT

A data access scheme for realizing a fast data writing into the secondary memory device. For a plurality of data present in a plurality of blocks provided in a secondary memory device, one of a plurality of blocks is selected as a writing block, each updated data is written into a region in the primary memory device corresponding to an invalid data portion in the selected writing block, and the writing block with each updated written is stored from the primary memory device into the secondary memory device. Here, an index having a data entry for each data which records an identifier of each data and a data position of each data in the secondary memory device can be provided such that each updated data is written into another position in the primary memory device different from a position of each data in the secondary memory device before an updating of each data, and the updating of each data is validated by changing the data position of each data recorded in the data entry in the index to that another position at which each updated data is written while the writing block is stored into the secondary memory device.

22 Claims, 13 Drawing Sheets

FIG.7A

| BLOCK NO. | # OF VALID DATA | UTILIZATION FLAG |
|---|---|---|
| 1 | 1234 | 0 |
| 2 | 9878 | 1 |
| ...... | | |

FIG.7B

| DESCRIPTOR NO. | DATA ENTRY POSITION | DATA POSITION |
|---|---|---|
| 1 | 3405 | 11203 |
| 2 | 412 | 3294 |
| ...... | | |

FIG.7C

| OPERATION NO. | DATA ENTRY POSITION | UPDATED DATA POSITION | DATA TO BE UPDATED POSITION |
|---|---|---|---|
| 32 | 4345 | 99999 | 1234 |
| ...... | | | |

FIG.7D

| DATA NO. | VALID DATA FLAG |
|---|---|
| 1 | 0 |
| 2 | 1 |
| ...... | |

FIG. 17A  FIG. 17B
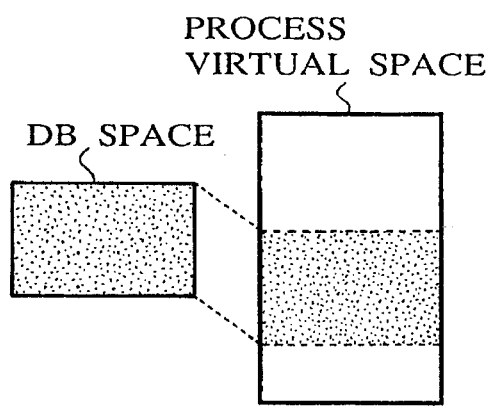
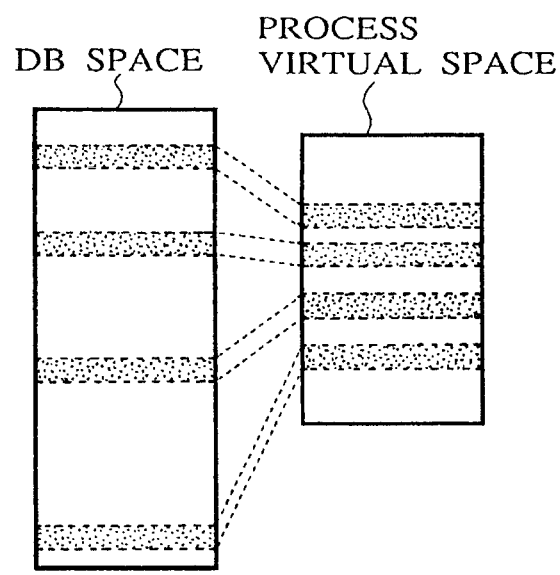
FIG. 18A
|    | DBID | offset | addr       | count | ring pointer |
|----|------|--------|------------|-------|--------------|
| 1  | 1    | 4096   | 0xff879200 | 10    | 38           |
| 2  | 1    | 8192   | 0xff939700 | 5     | ......       |
| 3  | 1    | 12288  | 0          | 1     | —            |
| ...| ...  | ...... | ......     | ...... | ......      |
| 38 | 2    | 4096   | 0xff302900 | 4     | 39           |
| 39 | 2    | 8192   | 0xff8f9200 | 7     | 2            |
FIG. 18B
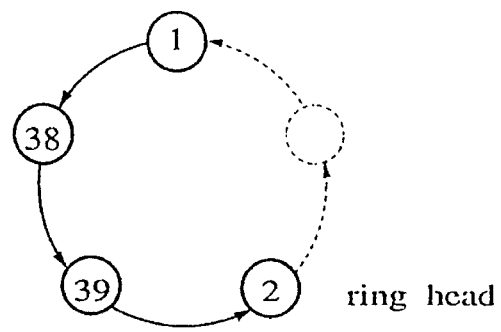
ring head

DATA ACCESS SCHEME WITH SIMPLIFIED FAST DATA WRITING

BACKGROUND OF THE INVENTION

1. Field of the Invention

The present invention relates to a data access scheme for making accesses to data stored in a storage device.

2. Description of the Background Art

Conventionally, there have been various types of data access scheme such as the database (abbreviated as DB hereafter) and the file system used for the purpose of enabling a plurality of applications to utilize data stored on the disk. Usually, the application executes a plurality of data read/write operations as one processing unit called the transaction. In the transaction processing, when a plurality of update operations are to be executed, all the updatings are validated only when all the update operations are successful, and all the updatings are invalidated when any one of the updated operations is unsuccessful due to the conflict with another transaction or other causes.

To this end, in the data access scheme, it is necessary to support the DB manipulation to validate all the updatings made by the transaction when it is commit (i.e., finished normally), and to invalidate all the updatings made by the transaction when it is abort (i.e., finished abnormally). Usually, such a DB manipulation is achieved by the following processings.

(1) The manipulation of data is carried out at a buffer in a memory to which data are read out from the disk.

(2) The updated results in the buffer are written into the disk at a time of the commit.

(3) The updatings made in the buffer are invalidated at a time of the abort.

In this type of a conventional data access scheme, as indicated in FIG. 1, the positions of the data in the disk 100 are fixedly determined at a time of inserting these data into the disk 100, and the subsequently updated results of the data are overwritten at the positions determined at a time of the insertion. As a consequence, in a case of updating a plurality of data simultaneously, as these plurality of data to be updated are not necessarily arranged continuously on the disk, there has been a problem that extra seek time is required at a time of the writing into the disk.

On the other hand, in the case of carrying out the data manipulation on the buffer, if the data are to be directly updated on the buffer to which the data are read out from the disk, there is a possibility for the data on the buffer to be written back to the disk by the OS at an arbitrary timing. In order to cope with such a possibility, there is a need to take the following provisions as indicated in FIG. 2.

(1) When the data to be updated does not exist on the buffer 102, the data to be updated is read out from the disk 100 to a first position on the buffer 102.

(2) At a time of updating, the updated data is written into the buffer 102 at a second position different from the position at which the data to be updated is read out from the disk 100 to the buffer 102.

(3) At a time of commit, the updated data is written into the first position from the second position, and if necessary, written back into the disk 100 from the first position.

Thus, the conventional data access scheme has been associated with the problems that a separate buffer region is required for the purpose of the data updating, and that a buffer manipulation is complicated in the data updating and the commit operation.

Now, as a data access scheme for resolving the above noted problems by reducing the seek time at a time of the writing into the disk, there is a scheme called log-structured file system (abbreviated as LSF hereafter) which is disclosed in M. Rosenblum and J. K. Ousterhout, "The Design and Implementation of a Log-Structured File System", Proceedings of 13th ACM symposium on Operating System Principles, pp. 1–15, 1991.

In this scheme, as indicated in FIG. 3, the extra seek time is reduced by collectively writing the updated data to a separated continuous region. Namely, in the LSF, the data are managed in units called blocks, and the writing into the disk is carried out in a unit called segment which comprises a plurality of blocks. In a case of updating a certain data, the block containing that certain data is stored into a buffer region in the memory corresponding to a segment to be written next, and the writing into the disk is carried out when that buffer region becomes full. In this manner, in the LSF, the seek time at the disk can be reduced as the writing into the disk is carried out with respect to a continuous region.

Moreover, in the LSF, the positions of data are managed by meta data and super blocks as shown in FIG. 4. That is, each meta data has pointers to all the blocks belonging to each file, while the super block has pointers to all the meta data for all the files. Thus, in a part (a) of FIG. 4, the meta data 4 for the file 1 has pointers to the blocks 2 and 3 belonging to the file 1 and the meta data 8 for the file 2 has pointers to the blocks 5, 6, and 7 belonging to the file 2, while the super block 9 has pointers to these meta data 4 and 8. In a case of manipulating a certain file, the meta data corresponding to that certain file is searched out according to the pointers of the super block, and the appropriate block belonging to that file is manipulated.

Here, the creation and updating of the file is carried out as indicated in a part (b) of FIG. 4. Namely, a part (b) of FIG. 4 shows a state in which a data is added to the file 1, a content of the file 2 is updated, and a new file 3 is created from a state shown in a part (a) of FIG. 4. In this exemplary case, the operation procedure is as follows.

(1) As the block 7 of the file 2 is updated, the updated result is placed at the block 10, and a new meta data for the file 2 pointing to the blocks 5, 6, and 10 is placed at the block 11.

(2) As a new file 3 is created, the data of this file 3 are placed at the blocks 12 and 13, and a meta data for this file 3 pointing the blocks 12 and 13 is placed at the block 14.

(3) As a data is added to the file 1, the added data of the file 1 are placed at the blocks 15 and 16, and a new meta data for the file 1 pointing the blocks 2, 3, 15, and 16 is placed at the block 17.

(4) The super block is usually set on the memory so that a new super block pointing the meta data 11, 14, and 17 is placed at the block 18, and written into the disk at a time of the check point.

However, because of the collective writing of the updated data into a separate continuous region, this LSF is associated with the following problems.

(1) Garbage collection

In the LSF, old blocks which become unnecessary as a result of updating (such as the blocks 4, 7, and 8 in FIG. 4) are produced discontinuously, so that there is a need of an operation called garbage collection (or segment cleaning) for securing a continuous free space by filling these old blocks with valid blocks, and this additional operation gives an additional overhead.

(2) Sequential ordering of writing into the buffer

In a case a plurality of threads are to carry out the update operations in parallel, there is a need to write all these updatings collectively into the disk. To this end, when the buffer corresponding to the segment of the LSF is to be shared by the threads, the writing into the buffer must be carried out in a sequential order, and this requires an extra processing for the concurrency control, which in turn gives an additional overhead.

In addition to these two problems, as the LSF is basically to be used as the file system of the OS, when this LSF is to be used for the DB manipulation, the following problems also arise.

(3) Index

In order to make accesses to the DB, various types of index have been developed, and a typical example is the tree structured index called B tree. Unlike the LSF which has only two hierarchical steps, the B tree usually has many hierarchical steps and a part corresponding to the meta data of the LSF itself has hierarchical structure, so that there is a need to write many new meta data in a case of rewriting the data. In this B tree, the data and the index are mixedly present on a single disk just like the LSF, but in the modified index called B+ tree, the data and the index are separated such that the index arranged on the disk can be searched by a reduced number of disk accesses. However, in order to support this type of index, the data position management scheme different from the LSF is necessary.

(4) Extra data writing

In the usual DB, a plurality of data are present in a single block. In such a case, according to the LSF, the entire block must be newly written even in a case of updating only one data in a certain block, so that the extra data writing will be required.

SUMMARY OF THE INVENTION

It is therefore an object of the present invention to provide a data access scheme capable of reducing the extra seek time at a time of the disk writing without requiring an additional operation such as the garbage collection, so as to realize a fast data writing into the disk.

It is another object of the present invention to provide a data access scheme capable of simplifying procedures for the data updating and the commit operation without requiring an extra buffer region.

It is still another object of the present invention to provide a data access scheme capable of dealing with a buffer manipulation by a plurality of threads without requiring a sequential ordering among the threads.

According to one aspect of the present invention there is provided a method of making accesses to a plurality of data present in a plurality of blocks provided in a secondary memory device by using a primary memory device, comprising the steps of: selecting one of said plurality of blocks as a writing block; writing each updated data into a region in the primary memory device corresponding to an invalid data portion in the writing block selected at the selecting step; and storing the writing block with each updated data written at the writing step from the primary memory device into the secondary memory device.

According to another aspect of the present invention there is provided a method of making accesses to a plurality of data present in a memory device, comprising the steps of: providing an index having a data entry for each data which records an identifier of each data and a data position of each data in the memory device; writing each data after an updating into another position in the memory device different from a position of each data in the memory device before the updating; and validating the updating of each data by changing the data position of each data recorded in the data entry in the index provided at the providing step to said another position at which each data after the updating is written at the writing step.

According to another aspect of the present invention there is provided a method of making accesses to a plurality of data present in a plurality of blocks provided in a secondary memory device by using a primary memory device, comprising the steps of: providing a buffer region in the primary memory device in which the data stored in the secondary memory device are placed, the buffer region being shared among a plurality of threads; selecting one of said plurality of blocks as a writing block for each thread; writing each updated data by each thread into a region on the buffer region provided at the providing step corresponding to an invalid data portion in the writing block selected for each thread at the selecting step; and storing the writing block with each updated data written at the writing step from the primary memory device into the secondary memory device.

According to another aspect of the present invention there is provided an apparatus for making accesses to a plurality of data, comprising: a secondary memory device having a plurality of blocks in which the data are present, and a primary memory device used for making accesses to the data in the secondary memory device; selecting means for selecting one of said plurality of blocks as a writing block; writing means for writing each updated data into a region in the primary memory device corresponding to an invalid data portion in the writing block selected by the selecting means; and storing means for storing the writing block with each updated data written by the writing means from the primary memory device into the secondary memory device.

According to another aspect of the present invention there is provided an apparatus for making accesses to a plurality of data, comprising: a memory device for storing said plurality of data; an index having a data entry for each data which records an identifier of each data and a data position of each data in the memory device; means for writing each data after an updating into another position on the memory device different from a position of each data on the memory device before the updating; and means for validating the updating of each data by changing the data position of each data recorded in the data entry in the index to said another position at which each data after the updating is written by the writing means.

According to another aspect of the present invention there is provided an apparatus for making accesses to a plurality of data, comprising: a secondary memory device having a plurality of blocks in which the data are present, and a primary memory device used for making accesses to the data in the secondary memory device, wherein a buffer region is provided in the primary memory device on which the data stored in the secondary memory device are placed, the buffer region being shared among a plurality of threads; selecting means for selecting one of said plurality of blocks as a writing block for each thread; writing means for writing each updated data by each thread into a region in the buffer region provided in the primary memory device corresponding to an invalid data portion in the writing block selected for each thread by the selecting means; and storing means for storing the writing block with each updated data written by the writing means from the primary memory device into the secondary memory device.

Other features and advantages of the present invention will become apparent from the following description taken in conjunction with the accompanying drawings.

BRIEF DESCRIPTION OF THE DRAWINGS

FIG. 7A is an illustration of a content of a block state table in the system of FIG. 5.

FIG. 7B is an illustration of a content of a data descriptor table used by a data descriptor management unit in the system of FIG. 5.

FIG. 7C is an illustration of a content of a writing information table used by a writing information storage unit in the system of FIG. 5.

FIG. 7D is an illustration of a content of a free space management table used by a writing operation unit in the system of FIG. 5.

FIG. 17A and 17B are diagrammatic illustrations of a DB space and a process virtual space for two possible cases.

FIG. 18A is an illustration of a mapping table used by an access method library in the second embodiment of FIG. 16.

FIG. 18B is an illustration of a ring list used by an access method library in the second embodiment of FIG. 16.

DETAILED DESCRIPTION OF THE PREFERRED EMBODIMENTS

Figure 1:
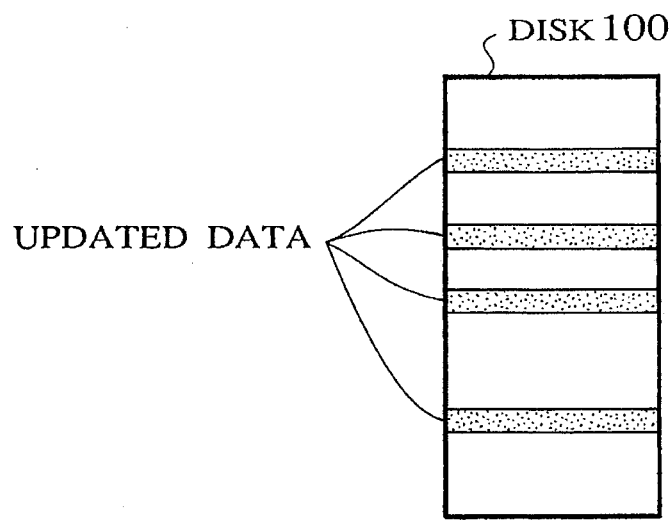
FIG. 1 is a diagram for explaining one conventional data access scheme.
Figure 2:
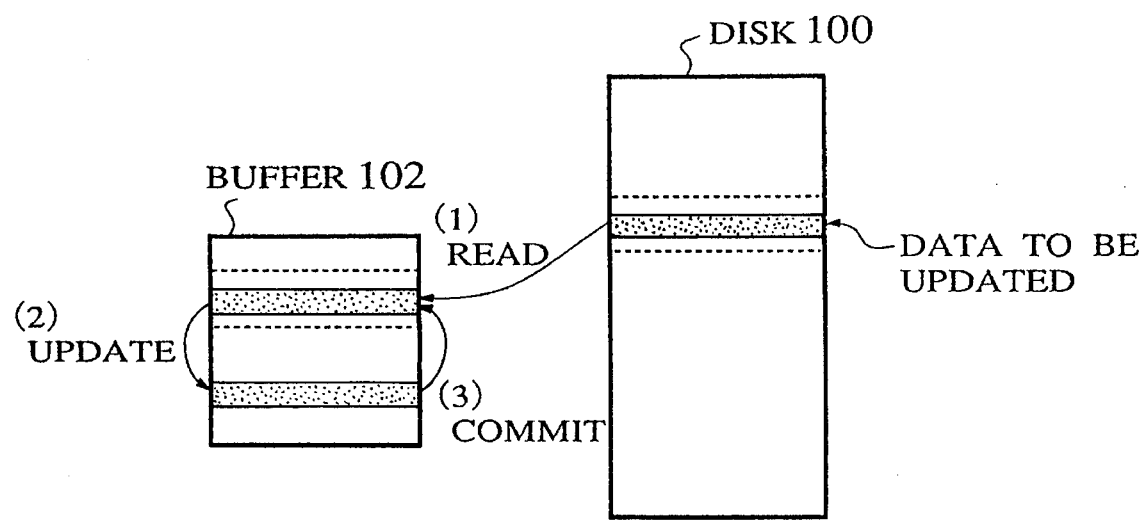
FIG. 2 is a diagram for explaining another conventional data access scheme.
Figure 3:
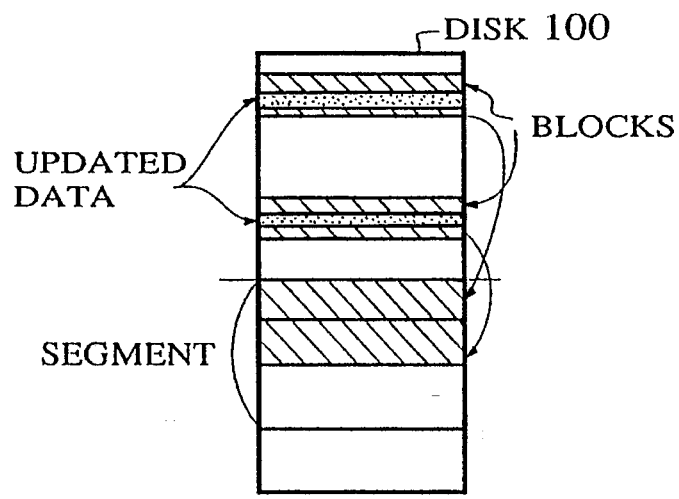
FIG. 3 is a diagram for explaining still another conventional data access scheme called LSF.
Figure 4:
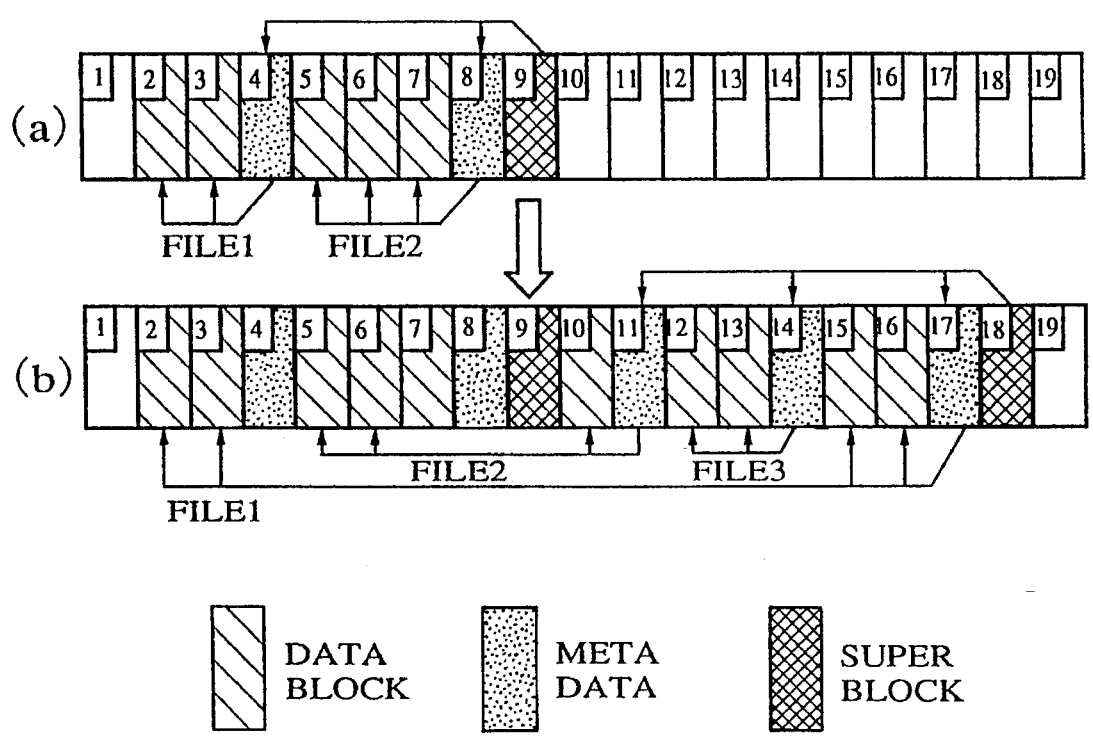
FIG. 4 is a diagram for explaining a data management scheme in the LSF.
Figure 5:
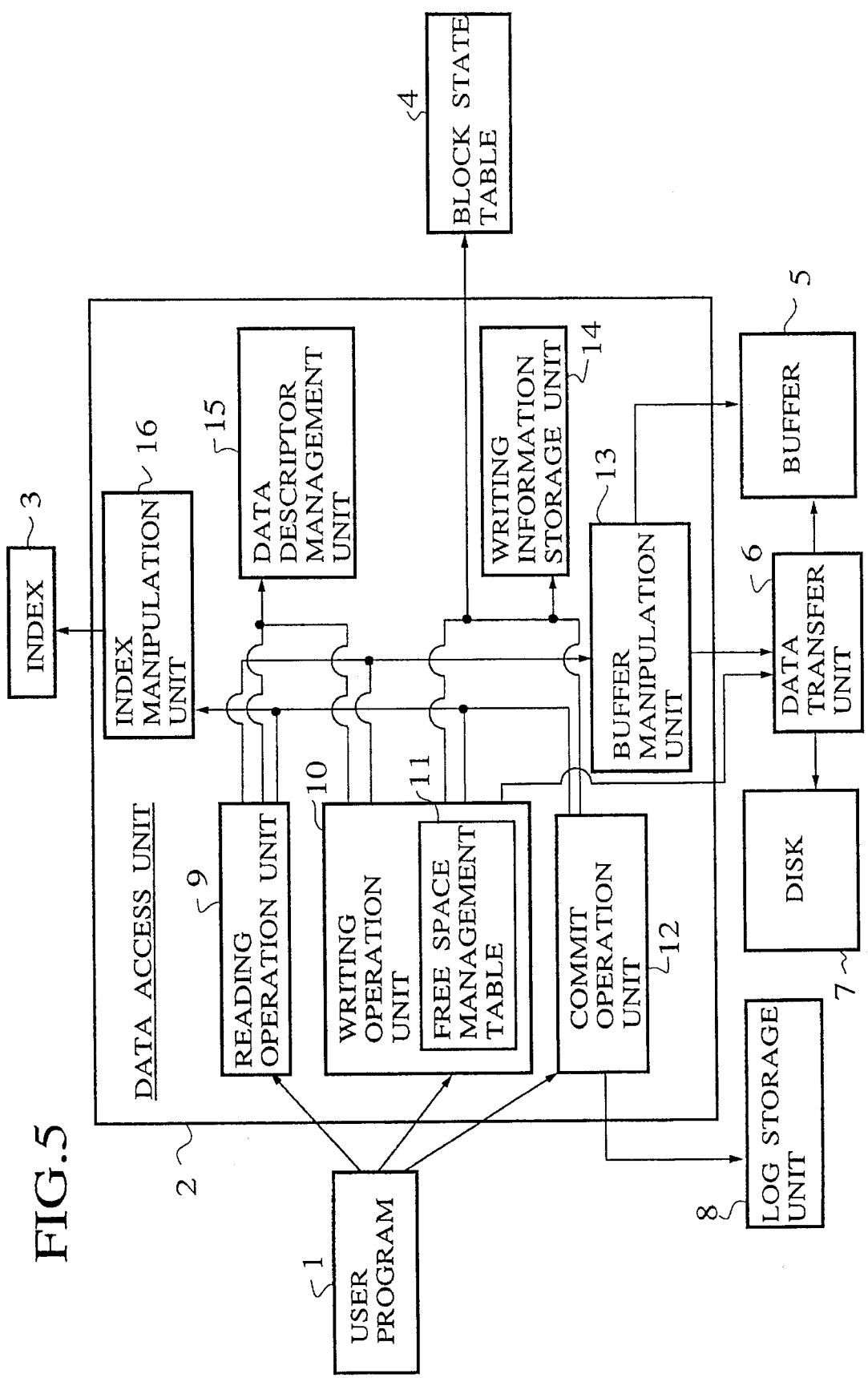
FIG. 5 is a block diagram of a system configuration for the first embodiment of a data access scheme according to the present invention.

Referring now to FIG. 5, a first embodiment of a data access scheme according to the present invention will be described in detail.

In this first embodiment, the data access system has a configuration as shown in FIG. 5, which comprises a plurality of user programs 1 (only one is shown in FIG. 5), a data access unit 2 provided in correspondence to each user program 1, an index 3, a block state table 4, and a log storage unit 8 to be accessed from a plurality of data access units 2, a disk 7 storing the data to be accessed by the user programs 1, a buffer 5 to be used in the data access operation with respect to the disk 7 by the data access unit 2, and a data transfer unit 6 for transferring the data between the disk 7 and the buffer 5 under the control of the data access unit 2.

Figure 6:
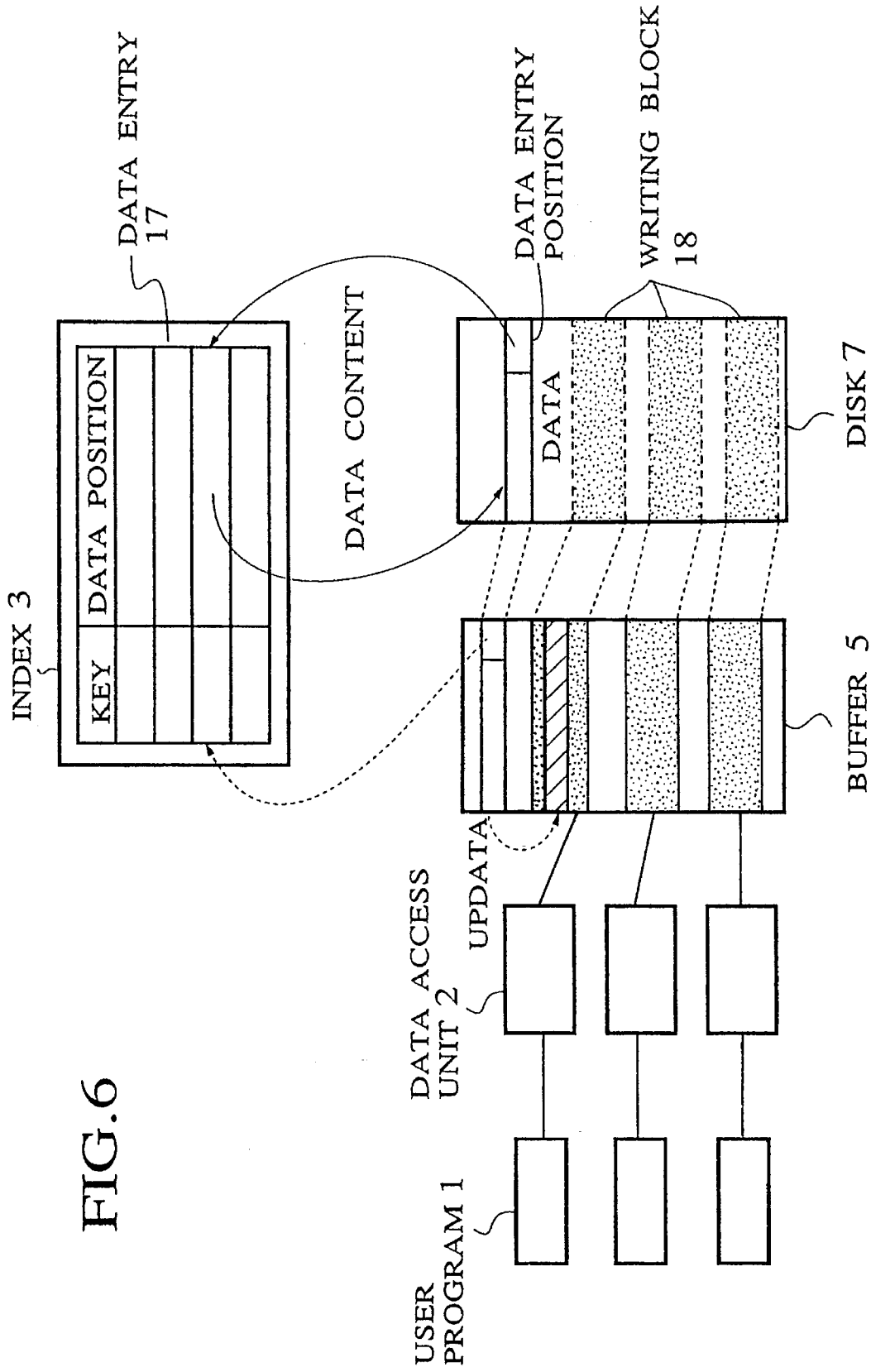
FIG. 6 is a diagram for explaining an index and data used in the system of FIG. 5.

As shown in FIG. 6, the index 3 has data entries 17 where each entry for each data contains a key of the data and a data position in terms of an offset from the top of the disk 7, while each data on the disk 7 has a data content and a data entry position indicating a position of the data entry 17 in the index 3 in terms of an offset from the top of the index 3. In addition, each data access unit 2 is assigned with a writing block 18 on the disk 7 for the purpose of writing the updated data into the disk 7. In a case of updating the data, the updated data are written into this writing block 18 assigned to each data access unit 2 and not overwritten on the data to be updated.

The block state table 4 stores a record for each block on the disk 7 which indicates a number of valid data in each block and a utilization flag indicating whether each block is used by the data access unit 2 or not, as shown in FIG. 7A.

The log storage unit 8 is formed by a non-volatile storage device such as a disk so as to guarantee the safety of the logs stored therein even when the system loses the power.

Also, as shown in FIG. 5, each data access unit 2 has a reading operation unit 9, a writing operation unit 10, and a commit operation unit 12 for carrying out the data reading, the data writing, and the commit operations requested from the user program 1, respectively, as well as an index manipulation unit 16 and a buffer manipulation unit 13 for manipulating the index 3 and the buffer 5, respectively. In addition, each data access unit 2 has a data descriptor management unit 15 for storing a data descriptor generated in response to each operation request from the user program 1, and a writing information storage unit 14 for storing a writing information with respect to each writing operation request. The reading operation unit 9 is connected with the buffer manipulation unit 13, the index manipulation unit 16, and the data descriptor management unit 15, and the writing operation unit 10 is connected with the buffer manipulation unit 13, the index manipulation unit 16, the data descriptor management unit 15, the writing information storage unit 14, the block state table 4, and the data transfer unit, while the commit operation unit 12 is connected with the index manipulation unit 16, the block state table 4, the writing information storage unit 14, and the log storage unit 8, and the buffer manipulation unit 13 is connected with the data transfer unit 6 as well as the buffer 5.

Here, the data descriptor to be generated in response to each operation request from the user program 1 has the data entry position and the data position for each data searched in response to the operation request, in correspondence to a data descriptor number which is to be returned to the user program 1 which issued the operation request. By means of this data descriptor, the search through the index 3 can be omitted in the subsequent data access to that data. The data descriptor management unit 15 stores such data descriptors in a table format as shown in FIG. 7B.

The writing information storage unit 14 has a table as shown in FIG. 7C for the purpose of storing the content of each writing operation requested by the user program 1 in a form of a writing information generated at the writing operation unit 10, where each writing information includes the data entry position, the updated data position and the data to be updated position for each writing operation identified by an operation number. This writing information will be utilized by the commit operation unit 12 at a time of validating the data.

The writing operation unit 10 also has a free space management table 11 in order to manage a free space to which the data can be written in the currently used writing block 18. This free space management table 11 has an entry for each data in the currently used writing block 18 containing a data number and a valid data flag indicating whether that data is valid or not.

In this system, the buffer 5 is accessible from each element of the data access unit 2 only through the buffer manipulation unit 13. In a case an access right with respect to each data is set up, the buffer manipulation unit 13 checks each access to the buffer 5 on which that data is present in order to prevent the improper access to that data. Also, when a requested data is not present on the buffer 5, the buffer manipulation unit 13 requests the data transfer from the disk 7 to the data transfer unit 6 so as to place that data on the buffer 5, and then permits an access to that data.

In this system, the user program 1 issues the request for the operation on the data to the data access unit 2, and the data access unit 2 carries out the requested operation according to the type of the request.

Figure 8:
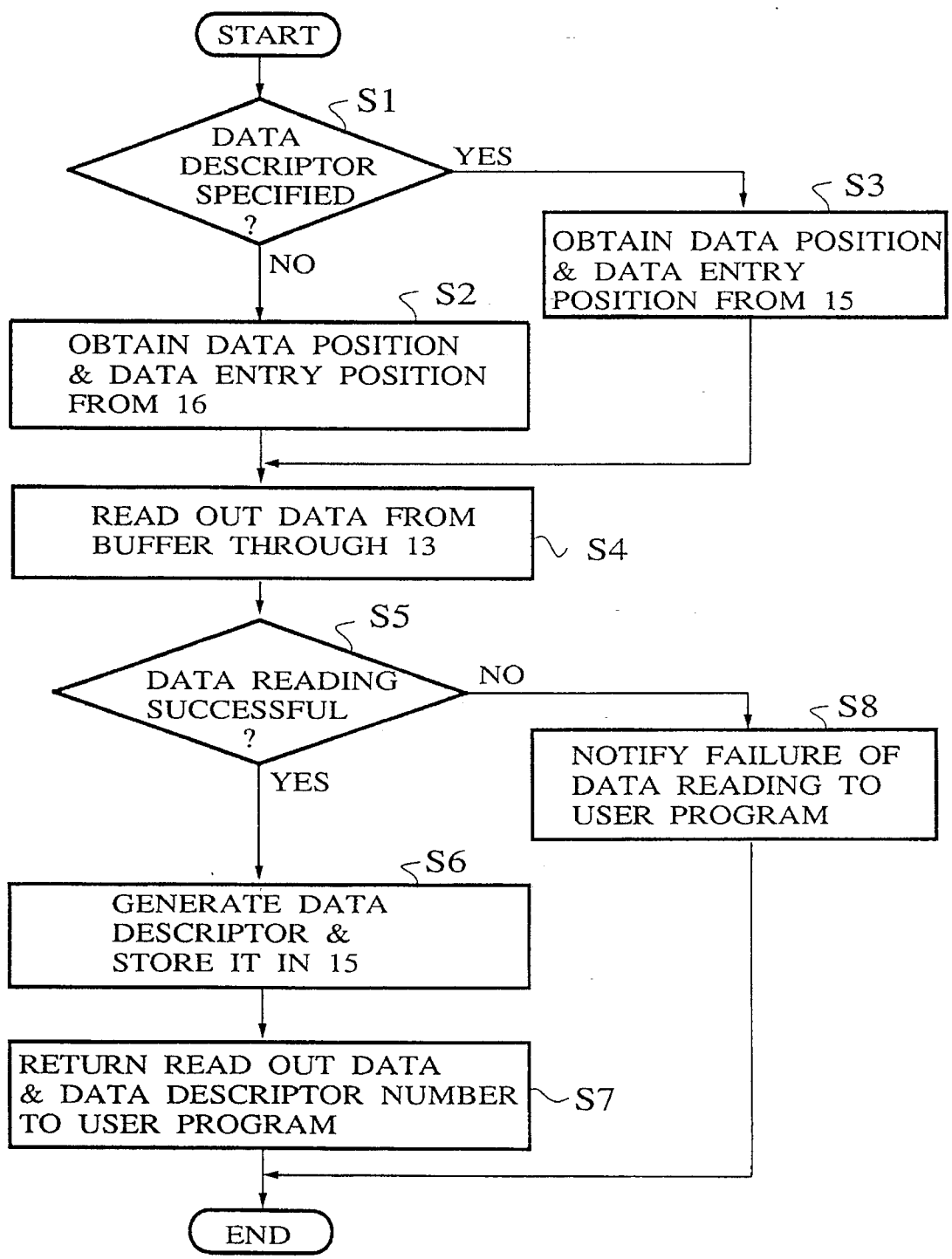
FIG. 8 is a flow chart for an operation of a reading operation unit in a data access unit of the system of FIG. 5.

In a case the operation request is the reading request, the reading operation unit 9 in the data access unit 2 operates according to the flow chart of FIG. 8 as follows. Here, the reading request can be made by specifying a data descriptor, or a key of the data to be read.

When the data descriptor is specified (step S1 YES), the reading operation unit 9 obtains the data position and the data entry position of the requested data from the data descriptor management unit 15 (step S3), whereas when the key of the data is specified (step S1 NO), the reading operation unit 9 issues the search request to the index manipulation unit 16 in order to check the location of the requested data on the disk 7 (step S2). In response, the index manipulation unit 16 searches out the data entry having a key coinciding with the key of the requested data in the index 3, and returns the data position and the data entry position for the searched out data entry as the search result to the reading operation unit 9. Then, the reading operation unit 9 reads out the data from the buffer 5 through the buffer manipulation unit 13 according to the search result received from the index manipulation unit 16 (step S4).

Figure 11:
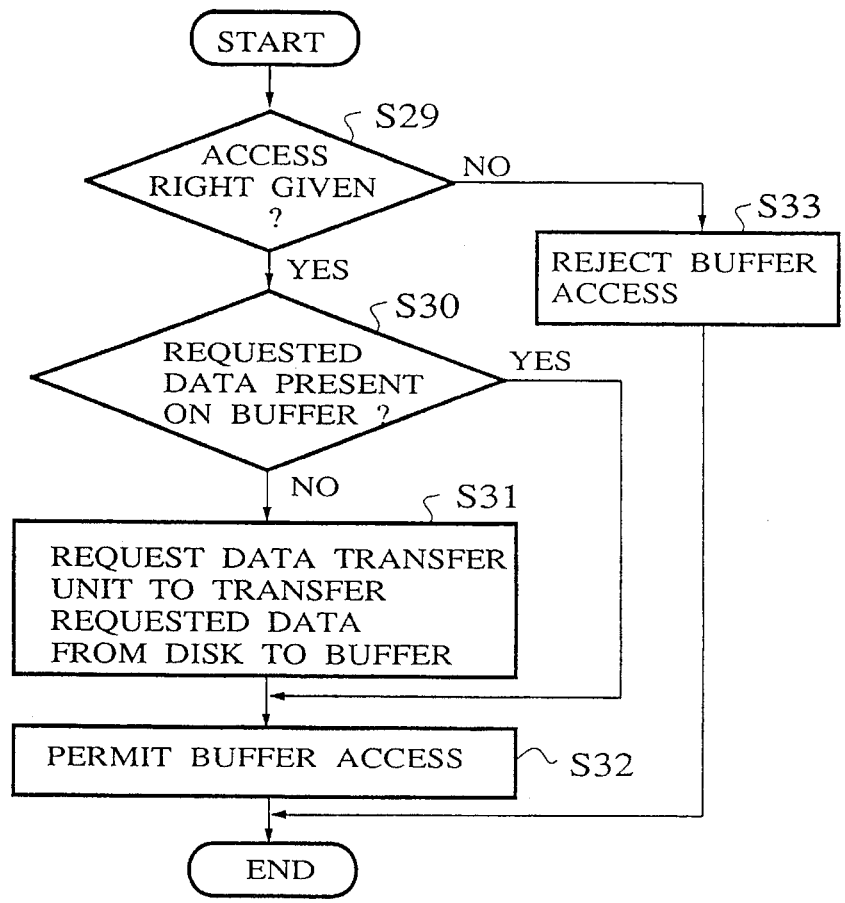
FIG. 11 is a flow chart for an operation of a buffer manipulation unit in a data access unit of the system of FIG. 5.

Here, the buffer manipulation unit 13 operates according to the flow chart of FIG. 11, to check the access right of the requested data. In a case the access right is given (step S29 YES), whether the requested data is present on the buffer 5 or not is checked (step S30), and when the requested data is not present on the buffer 5, the transfer of the requested data from the disk 7 to the buffer 5 is requested to the data transfer unit 6 (step S31) to place the requested data on the buffer 5, and then the access to the buffer 5 is permitted (step S32). On the other hand, in a case the access right is not given (step S29 NO), the access to the buffer 5 is rejected (step S33).

Then, when the data reading is successful (step S5 YES), the reading operation unit 9 generates the data descriptor indicating the data entry position and the data position for the read out data and stores the generated data descriptor in the data descriptor management unit 15 (step S6), while returning the read out data and the data descriptor number to the user program 1 (step S7). On the other hand, when the data reading is unsuccessful (step S5 NO), the reading operation unit 9 notifies the failure of the data reading to the user program 1 (step S8).

Figure 9:
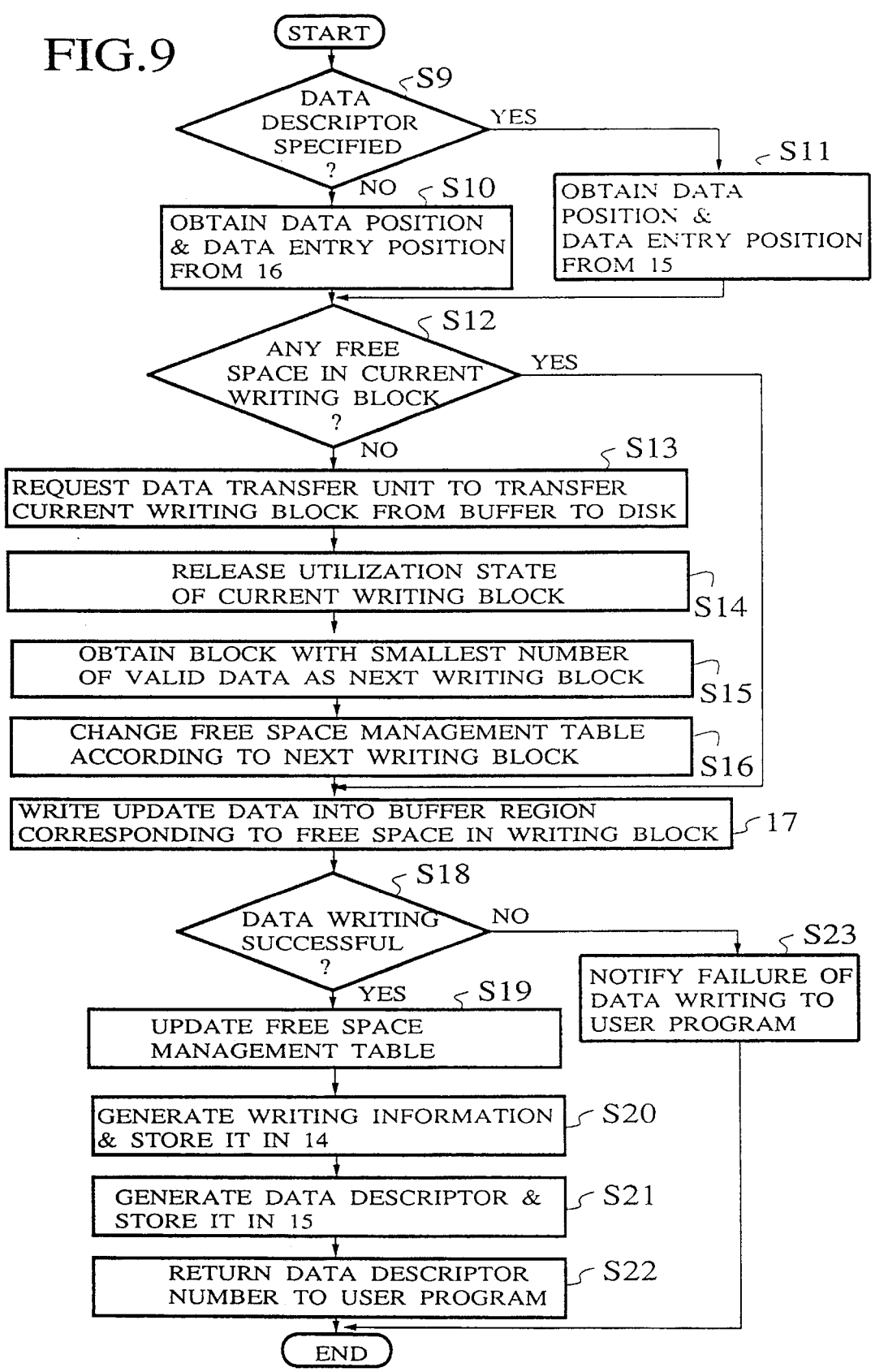
FIG. 9 is a flow chart for an operation of a writing operation unit in a data access unit of the system of FIG. 5.

In case the operation request is the writing request to update the data, the writing operation unit 10 in the data access unit 2 operates according to the flow chart of FIG. 9 as follows. Here, the writing request can be made by specifying a data descriptor, or a key of the data to be written.

When the data descriptor is specified (step S9 YES), the writing operation unit 10 obtains the data position and the data entry position of the data to be updated from the data descriptor management unit 15 (step S9 NO), the writing operation unit 10 issues the search request to the index manipulation unit 16 in order to check the location of the requested data on the disk 7 and receives the data position and the data entry position of the data to be updated from the index manipulation unit 16 (step S10).

Then, the writing operation unit 10 checks the free space for writing the updated data according to the free space management table 11 (step S12), and when the free space is available in the current writing block 18 (step S12 YES), the writing operation unit 10 writes the updated data into a region of the buffer corresponding to the free space in the current writing block 18, through the buffer manipulation unit 13 (step S17). Here, the buffer manipulation unit 13 operates according to the flow chart of FIG. 11 as described above.

Here, the writing operation unit 10 manages the free space in the current writing block 18 to which the updated data can be written according to the free space management table 11, and when the data writing is successful (step S18 YES), the writing operation unit 10 updates the free space management table 11 to indicate that the space into which the updated data are written is no longer free (step S19). As for the data entry position to be set in the updated data, the data entry position of the data to be updated obtained either from the index manipulation unit 16 or the data descriptor management table 15 is set in the updated data.

Then, the writing operation unit 10 generates the writing information indicating the positions of the data entry, the updated data, and the data to be updated, and store the generated writing information in the writing information storage unit 14 (step S20). The writing operation unit 10 also generates the data descriptor indicating the data entry position and the data position for the updated data and stores the generated data descriptor in the data descriptor management unit 15 (step S21), while returning the data descriptor number to the user program 1 (step S22). On the other hand, when the data writing is unsuccessful (step S18 NO), the writing operation unit 10 notifies the failure of the data writing to the user program 1 (step S23).

When the free space is not available (step S12 NO), the writing operation unit 10 request the data transfer unit 6 to transfer all the data in the current writing block 18 collectively from the buffer 5 to the disk 7 (step S13). In response, the data transfer unit 6 writes the entire block in the buffer 5 corresponding to the current writing block into the current writing block of the disk 7. Then, after the current writing block 18 is collectively written into the disk 7, the writing operation unit 10 release the utilization state of that writing block 18 by changing the utilization flag in the block state table 4 (step S14), while obtaining a next writing block 18 by selecting a block with the smallest number of valid data from the block state table 4, and changing the utilization flag for that selected block (step S15). After the new writing block 18 is obtained, the data in the free space management table 11 are changed according to the new writing block 18 (step S16). Here, the valid data can be judged as those data for which the data position in the data entry 17 specified by the data entry position of each data coincides with the actual data position of each data, and those which are not the valid data can be judged as the invalid data which can be registered as the free space in the free space management table 11. Then, the steps S17 to S23 as described above are carried out with respect to this new writing block 18.

Figure 10:
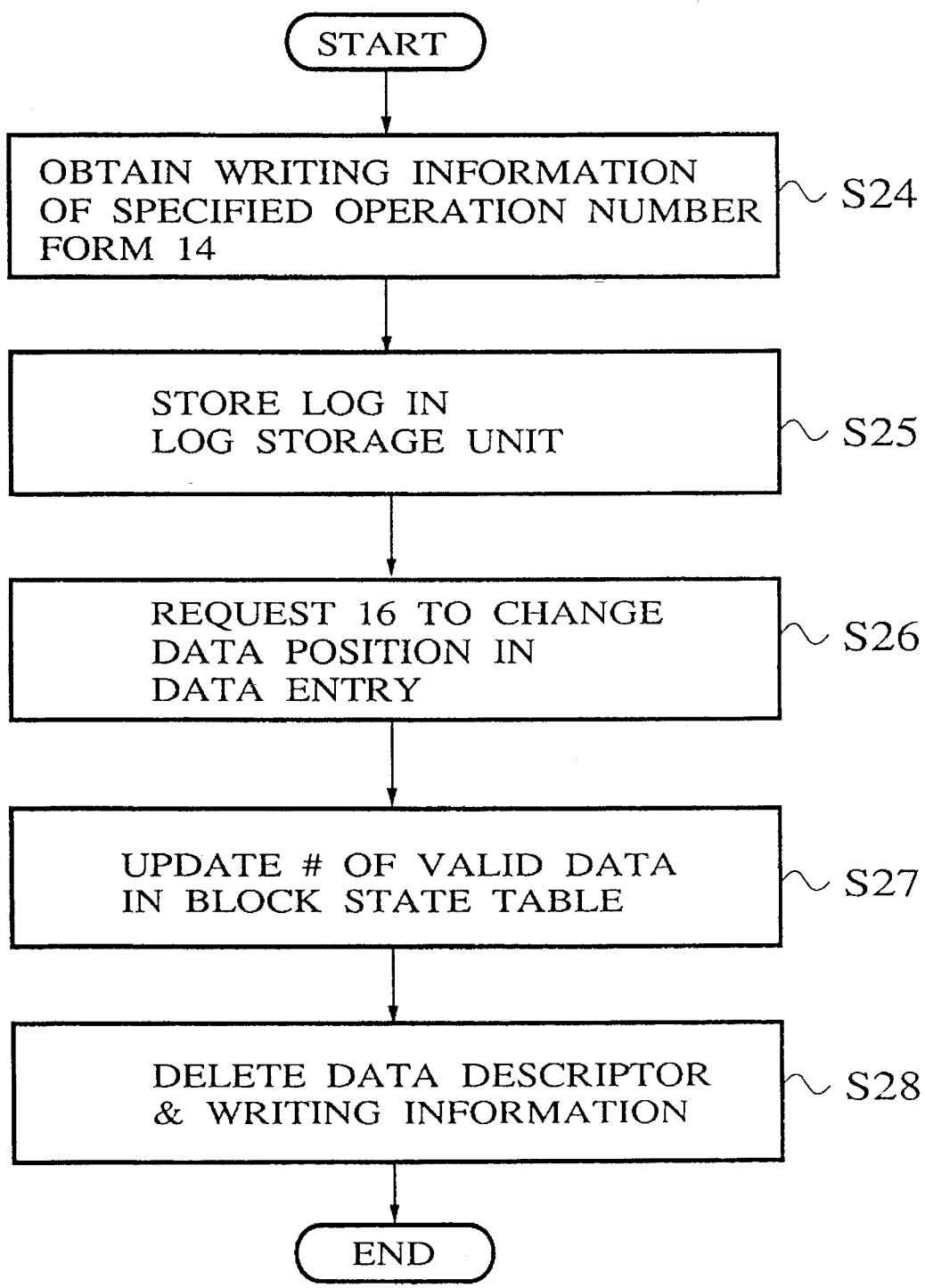
FIG. 10 is a flow chart for an operation of a commit operation unit in a data access unit of the system of FIG. 5.

In a case the operation request is the commit request to validate the updated data written by the writing operation, the commit operation unit 12 in the data access unit 2 operates according to the flow chart of FIG. 10 as follows. Here, the commit request can be made by specifying an operation number of the writing operation.

First, the writing information of the operation number specified by the request is obtained from the writing information storage unit 14 (step S24). In a case the processing mode is the transaction processing, the target data of the commit operation are those data which are written since the occurrence of that transaction until a time of the commit. In order to indicate these target data of the commit operation, the operation number assigned to each writing information entry in the writing information storage unit 14 indicates the transaction identifier.

Next, in order to guarantee the atomicity and the durability of the transaction processing, the data positions of the data before and after the updating, and the content of the updated data are stored in the log storage unit 8 as a log of the transaction (step S25). In the usual data access scheme, the before image and the after image of the data are stored as a log, but in this embodiment, the data before the updating is not going to be lost until the transaction is committed, so that it suffices to store only the after image of the data as a log.

Then, in order to change the data entry 17 for each target data to indicate the updated data, the data entry position of the data entry 17 and the updated data position are notified to the index manipulation unit 16 so as to request the index manipulation unit 16 to change the data entry 17 for each target data (step S26). In response, the index manipulation unit 16 changes the data position in the data entry 17 specified by the notified data entry position to the data position of the updated data.

Also, the data to be updated is going to be changed to an invalid data while the updated data is going to be changed to a valid data, so that the block state table 4 is updated by reducing the number of valid data for the block containing the data to be updated by one and increasing the number of valid data for the block containing the updated data by one (step S27).

Finally, the data descriptor stored in the data descriptor management unit 15 and the writing information stored in the writing information storage unit 14 for each target data are deleted (step S28).

The data transfer unit 6 transfers the block containing the requested data from the disk 7 to the buffer 5 in response to a request from the reading operation unit 9 or the writing operation unit 10, and writes the block in the buffer 5 into the disk 7 when the writing operation unit 10 releases the writing block 18. Here, when the writing into the disk 7 is requested from a plurality of writing operation units 10 in a plurality of data access units 2 at the same time, there is a need to carry out the writing into the disk 7 in the sequential order according to these requests, in order to eliminate the unnecessary seek time of the disk 7 that would be required later on when a plurality of writing operations are carried out in an interleaving manner.

Figure 12:
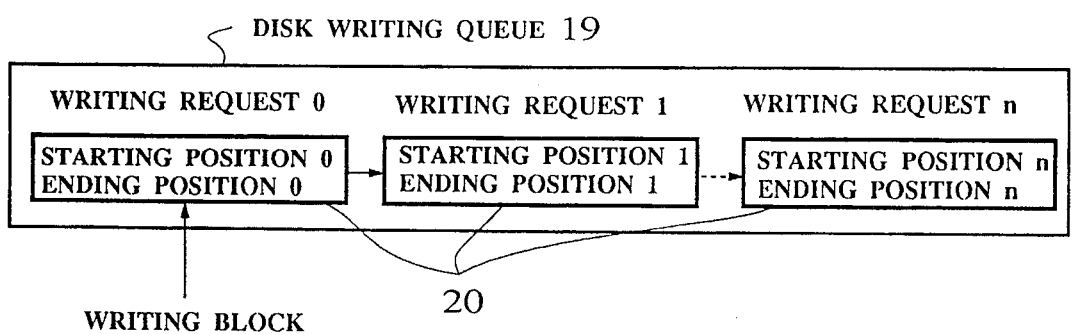
FIG. 12 is a diagram of a disk writing queue used by a data transfer unit in the system of FIG. 5.

In a case of carrying out the writing into the disk 7 in the sequential order, there is a possibility for the next request to arrive during the writing into the disk 7, so that the data transfer unit 6 manages a disk writing queue 19 as shown in FIG. 12. Here, when a plurality of writing requests 20 exist in the queue 19, after the current writing request 0 is finished, the next writing request 1 on the queue 19 is going to be processed, and here the writing into the disk 7 can be carried out more efficiently by adopting the following measures.

(1) After the process for the writing request 0 is finished, the entire queue 19 is checked to see if there is any request for writing the data which are continuous to the data to be written by the writing request 1, and if such a request is found, it is processed together with the writing request 1 by writing all these continuous data collectively.

(2) After the process for the writing request 0 is finished, the entire queue 19 is checked to see if there is a request for writing the data which are continuous to the data written by the writing request 0, and if such a request is found, it is processed next.

As described, according to this first embodiment, the block with the smallest number of valid data is selected from the block state table as the writing block, the invalid data portion in the selected writing block is detected by comparing the data position of each data and the data position in the index, and the updated data are written into the invalid data portion of the writing block and then written into the disk, so that it is possible to reduce the extra seek time at the time of the disk writing without requiring an additional operation such as the garbage collection, so that it is possible to realize a fast data writing into the disk.

Also, at the time of data updating, the updated data are written into the positions different from the data to be updated, and the data position in the index is updated to the data position of the updated data at the time of the commit, so that the updating and commit operations can be processed efficiently without requiring the extra buffer region.

Moreover, by assigning the writing block for each user program, it is possible to carry out the data writing into the buffer without requiring the sequential ordering of the writing operations.

Next, a second embodiment of a data access scheme according to the present invention will be described in detail.

In this second embodiment, the concept of the present invention as described in the first embodiment above is applied to an access scheme in which the DB is used as a memory mapped file on a file system (abbreviated hereafter as FS) of the UNIX.

Figure 13:
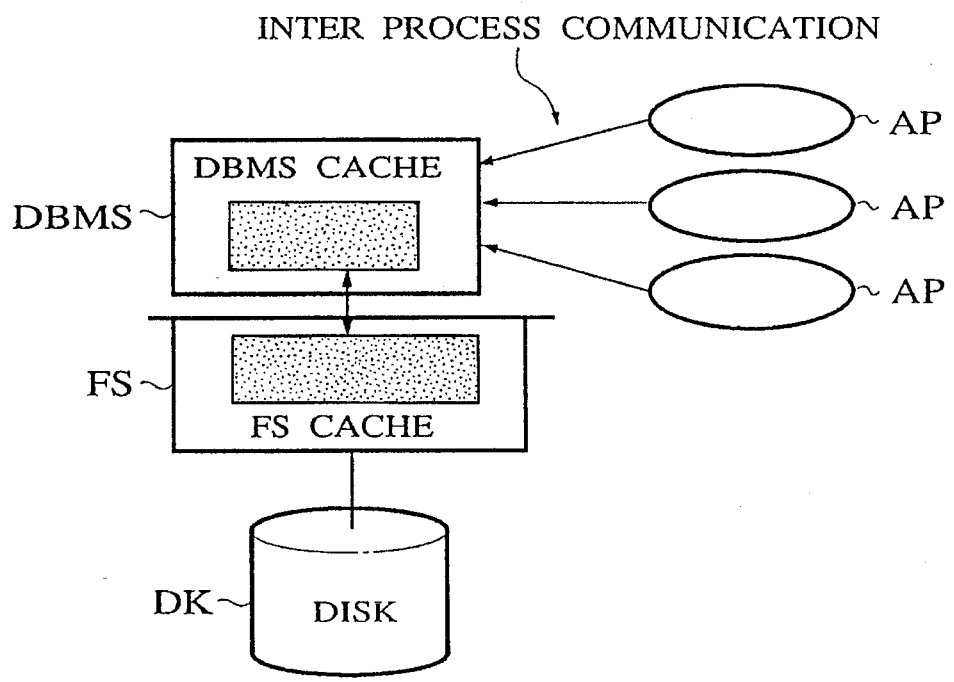
FIG. 13 is a diagram for explaining one conventional DB access scheme in the UNIX file system.
Figure 14:
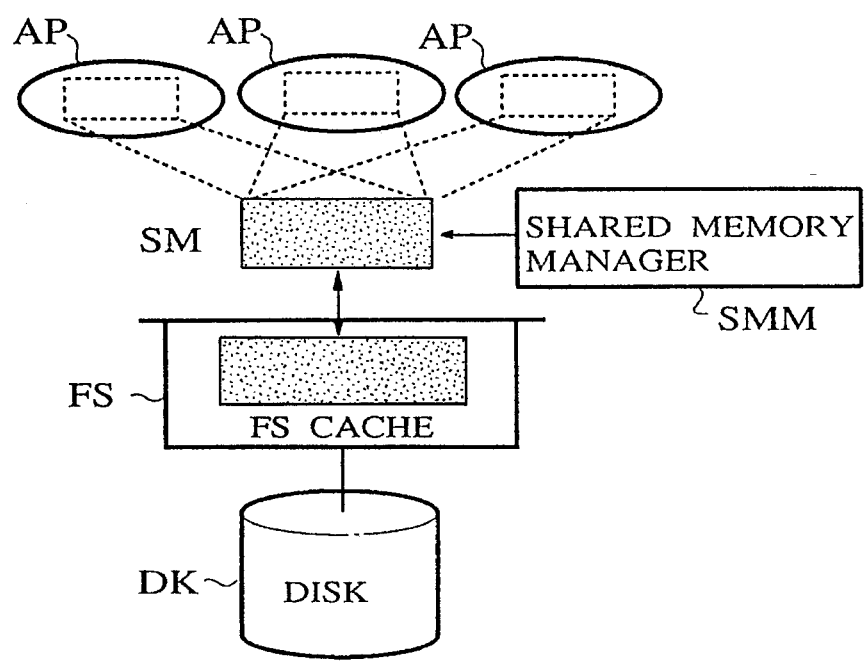
FIG. 14 is a diagram for explaining another conventional DB access scheme in the UNIX file system.

In FIGS. 13 and 14, the conventional DB access schemes on the UNIX file system are shown. In the case of storing the DB as a UNIX file, the access to the DB is made through an FS. In order to make accesses to the files at high speed, the FS places the contents of the files in an FS cache provided in the memory, and the files are manipulated in the FS cache. The content of the FS cache is written into the disk DK at a time of closing the file, at a time of receiving the writing request from the user, and at a time of the replacement of the FS cache. In the transaction, the updating of the file should not be validated until a time of the commit, but the replacement of the FS cache cannot be controlled from the user program, so that there is a need to carry out the updating at a memory region other than the FS cache, and to hand over the updated content to the FS at a time of the commit.

In the conventional scheme shown in FIG. 13, the DB management process called DBMS (Data Base Management System) carries out the manipulation of the DB. In this case, the application programs AP makes the DB manipulation request with respect to the DBMS by means of the inter process communication. The DBMS places the contents of the files read out from the FS on a DBMS cache such that the updating request from the application is handled on that DBMS cache and the content of the DBMS is written into the FS at a time of the commit. In such a case, similar contents are to be cached in the DBMS and the FS, so that it requires an extra memory. Also, all the DB accesses are to be made by means of the rather time consuming inter process communication so that the overall processing time inevitably increases.

On the other hand, in the conventional scheme shown in FIG. 14, the DB data are placed in a shared memory SM, and the application programs AP which share that shared memory SM update the DB data directly in that shared memory SM, so that it is possible to carry out the DB access at higher speed compared with a case of FIG. 13 using the inter process communication. The data transfer between the FS and the shared memory SM is carried out by a shared memory manager SMM. At a time of the commit, according to the request from the application program, the data on the shared memory SM are handed over to the FS by the shared memory manager SMM, and then the writing into the disk DK is carried out by the FS.

In this type of the conventional scheme, the overhead due to the inter process communication is eliminated, but it also requires an extra memory in order to cache the similar contents on the shared memory SM and the FS.

Figure 15:
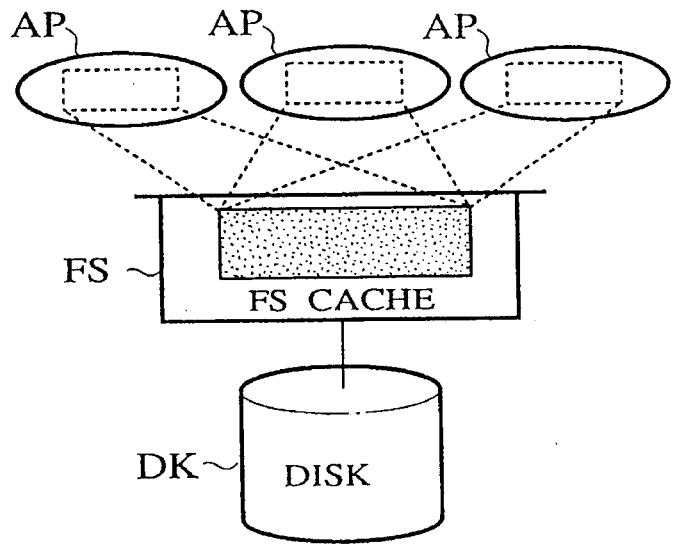
FIG. 15 is a diagram for explaining still another conventional DB access scheme in the UNIX file system called memory map scheme.

On the other hand, there is also a conventional scheme called memory map scheme as shown in FIG. 15 in which each application program AP maps the DB file. Namely, the UNIX provides a method for making an access to a file by mapping the file into the own process space and executing a processing similar to the memory manipulation. The system calls for this purpose includes the "mmap" system call for mapping the memory into the own process space, the "msync" system call for writing a particular range of the mapped file into the disk, and "mprotect" system call for setting up reading/writing right for each certain mapped range. In this scheme, the processing is high speed as there is no need to use the inter process communication, and the data are cached only at a single location in the memory, so that the memory can be utilized efficiently. When the memory is utilized efficiently, it becomes possible to cache more data in the memory, so that the processing can be carried out at even higher speed.

However, even in the case of this memory map scheme, the replacement of the FS cache cannot be controlled from the user program as mentioned above, so that there is a possibility for the data updated by the transaction to be written into the disk DK before the transaction is committed. In addition, the amount of data that can be mapped is limited by the size of the process virtual space. For instance, the process virtual space of the UNIX on the 32 bit processor is usually about 4 GB so that the DB file exceeding this capacity cannot be mapped.

Figure 16:
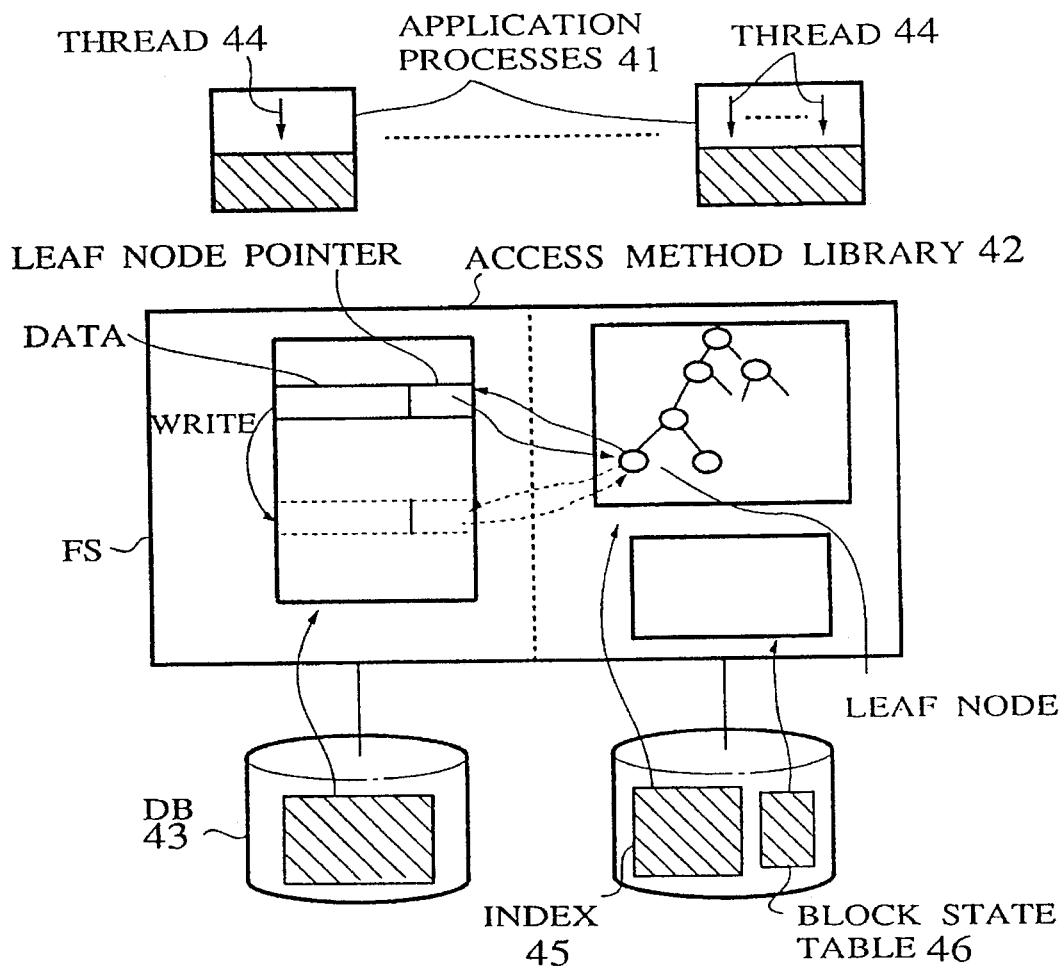
FIG. 16 is a diagram of a configuration for the second embodiment of a data access scheme according to the present invention.

These problems associated with the conventional schemes can be resolved by applying the concept of the present invention to the above described memory map scheme as shown in FIG. 16. Namely, in FIG. 16, application processes 41 for making accesses to the data are linked with an access method library 42, and the access to the database DB 43 is made through this access method library 42. Here, each application process 41 is executed by a single thread or a plurality of threads (multi-threads) 44. The access method library 42 has an internal configuration similar to the data access unit in the first embodiment described above, and maps the DB 43, an index 45, and a block state table 46 into the own process space by using the "mmap" system call. Here, the writing block used in the first embodiment is secured one for each access method library 42, so that in a case where the application process 41 is executed by the multi-threads 44, a single writing block is going to be shared among a plurality of threads. In this case, the exclusive control among the threads is carried out within the access method library 42. Also, by using the "mprotect" system call, only the writing block of the own process is set to be reading/writing permitted for each process and the other regions are set to be in a read only status, so as to prevent the improper access.

The index 45 is the tree structured index called B+ tree, which has a pointer to the data in the DB 43 from the lowermost leaf (leaf node). The DB 43 stores a plurality of records, and each record has a pointer to the leaf node of the index pointing to that record. Also, for each block of the DB file, the block state table 46 has the information on a number of valid data in the block and a utilization flag indicating whether it is currently used as the writing block or not.

In this case, the updating of the data is carried out by the following procedure.

(1) At a time of the data writing, the data after the updating is written into a free space within the writing block.

(2) At a time of the commit, a pointer between the leaf node and the data before the updating is replaced by a pointer between the leaf node and the data after the updating, and the block state table 46 is updated by reducing the number of valid data in the block at which the data updated by the transaction exists by one while increasing the number of valid data in the writing block by one for each updated data.

Also, when there is no more free space in the currently used writing block, the access method library 42 writes the entire writing block into the DB 43 by using the "msync" system call. After that, the block state table 46 is checked in order to obtain the new writing block.

Then, the access method library 42 selects the block with the smallest number of the valid data which is not used by the other processes from the block state table 46 as a new writing block, and changes the utilization flag of that selected block in the block state table 46. After that, in order to check the free space in the new writing block, the data pointers of the data entries pointed by the pointers of the data in that new writing block are checked. When the data enter pointed by the pointer of one data is pointing that one data itself, that one data is a valid data, whereas otherwise the data is an invalid data which has already been updated.

Here, when the DB to be mapped is smaller than the process space as shown in FIG. 17A, the entire DB can be mapped into the continuous space in the process space, but when the DB to be mapped is larger than the process space as shown in FIG. 17B, there is a need to map the DB in part as indicated in FIG. 17B.

In such a case, a mapping table for managing which part of the DB has been mapped to which region of the process space as shown in FIG. 18A is provided in each access method library 42. In this case, the writing block is always mapped, and the necessary parts of the other blocks which can be the reading target are also mapped. Here, the management is carried out such that the more frequently accessed blocks are mapped into the process space while the data in the less frequently accessed blocks are to be read out by using the "read" system call. When the block which had been less frequently accessed becomes more frequently accessed, the replacement operation for unmapping the mapped page and newly mapping that block is carried out.

In this mapping table of FIG. 18A, for each DB, the offset of the mapped block in the DB, the mapped address (addr) in the process space, and the number of times that block has been accessed (count) are recorded. When the actual address is recorded in the "addr" field, it indicates that the block is actually mapped, whereas when "0" is recorded in the "addr" field, it indicates that the block is actually not mapped. In addition, the access method library 42 has a ring list of the mapped blocks as shown in FIG. 18B, and the "ring pointer" field of the mapping table of FIG. 18A records a pointer with respect to an entry in this mapping table of a next block on that ring list. Moreover, a "ring head" for pointing a position to start the search of the ring list and a "min count" for recording the smallest access count number among the blocks in the ring list are also provided. This "min count" is utilized in determining a block in the ring list which is to be replaced by another block which is not mapped yet.

Figure 19:
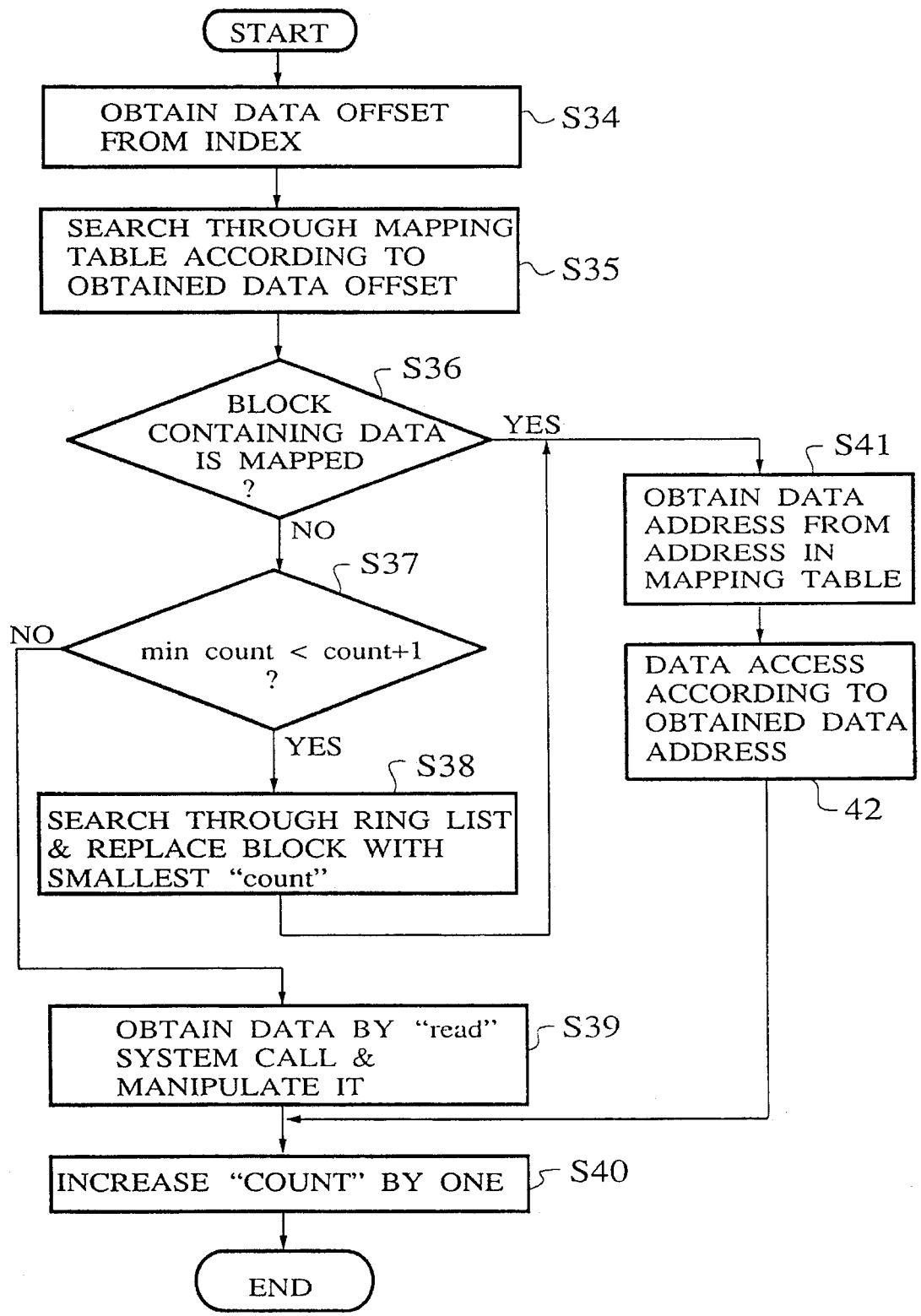
FIG. 19 is a flow chart for an operation of an access method library in the second embodiment of FIG. 16 using a mapping table and a ring list of FIGS. 18A and 18B.

In this case, the data is read out by using the mapping table of FIG. 18A according to the flow chart of FIG. 19 as follows. Namely, in a case of reading out the data, the data offset is obtained from the index 45 first (step S34). Then, the mapping table is searched through according to the obtained data offset (step S35).

When the "addr" field of the corresponding entry is set to be an address other than "0", it indicates that the block containing that data is mapped (step S36 YES), so that the address of that data is calculated from the address recorded in the mapping table (step S41), and the data access is made with respect to that calculated address (step S42). Then, the value recorded in the "count" field is increased by one (step S40).

On the other hand, when the "addr" field of the corresponding entry is set to be "0", it indicates that the block containing that data is not mapped (step S36 NO), so that a value ("count"+1) and the "min count" in the ring list are compared (step S37) to see if there is any block with the "count" greater than the "min count" of the ring list. When the value ("count+1) is less than the "min count" (step S37 NO), the data is obtained by the "read" system call and manipulated (step S39), and then the "count" field is increased by one at the step S40.

On the other hand, when the value ("count"+1) is greater than the "min count" (step S37 YES), the replacement of the block with the smallest "count" value in the ring list is carried out by the following procedure (step S38).

(1) The entry with the smallest value for the "count" is searched out in the ring list.

(2) The searched out block is unmapped, and the "addr" field of the entry for that block is set to be "0".

(3) The block with the value ("count"+1) greater than the "min count" is mapped, and the mapped address is set to the "addr" field of the entry for that block.

Then, the process proceeds to the step S41 described above, just as in the case in which the block has been mapped.

Here, the "count" in the mapping table is decreased by one in each prescribed period of time, and bounded above by a certain value "MAX COUNT". Also, the "min count" is recorded by searching out the block with the smallest number of accesses among the ring list whenever the "count" is decreased. By means of this, the block that has happened to be accessed heavily within a certain period of time alone and not accessed very much after that period is going to be a target of the replacement within a fairly short period of time. Also, the block with a larger value for the "count" field in the mapping table has a higher probability for being placed in the memory, so that by selecting the block with the larger value for the "count" field with a higher priority at a time of selecting the writing block, it is possible to expect a reduction of the reading operations that have to be done with respect to the DB 43.

As described, according to this second embodiment, by applying the concept of the present invention to the memory map scheme in the UNIX, it becomes possible to realize the data access scheme in which the memory is utilized more efficiently and the writing into the disk is carried out at higher speed.

It is to be noted that, among the features of the present invention described above, a feature concerning a manner of data updating in which the updated data are written into the position different from the data to be updated and then the data position in the index is updated to the data position of the updated data at a time of the commit may be utilized separately from the other features of the present invention, and applied to the data updating procedure in the LSF for example, for the purpose of improving the efficiency in the updating and commit operations without requiring the extra buffer region.

It is also to be noted here that many modifications and variations of the above embodiments may be made without departing from the novel and advantageous features of the present invention. Accordingly, all such modifications and variations are intended to be included within the scope of the appended claims.

What is claimed is:

1. A method of making accesses to a plurality of data present in a plurality of blocks provided in a secondary memory device by using a primary memory device, comprising the steps of:

selecting one of said plurality of blocks as a writing block;

writing each updated data into a region in the primary memory device corresponding to an invalid data portion in the writing block selected at the selecting step; and storing the writing block with each updating data written at the writing step from the primary memory device into the secondary memory device.

2. The method of claim 1, wherein at the selecting step, one of said plurality of blocks which has a smallest number of valid data among said plurality of blocks is selected as the writing block.

3. The method of claim 1, wherein at the selecting step one of said plurality of blocks which is already present in the primary memory device is selected as the writing block.

4. The method of claim 1, further comprising the steps of:

providing an index having a data entry for each data which records an identifier of each data and a data position of each data in the secondary memory device, wherein at the writing step, each updated data is written into another position in the primary memory device different from a position of each data in the secondary memory device before an updating of each data; and validating the updating of each data by changing the data position of each data recorded in the data entry in the index provided at the providing step to said another position, while the writing block is stored at the storing step.

5. The method of claim 4, further comprising the steps of:

accompanying each data with a data entry address indicating a position of the data entry for each data in the index provided at the providing step; and detecting the invalid data portion in the writing block selected at the selecting step by comparing the data position of each data in the writing block with the data position of each data recorded in the data entry in the index indicated by the data entry address accompanying each data.

6. The method of claim 1, further comprising the step of:

reading each data to be accessed from the secondary memory device to the primary memory device one data by one data, whenever said each data to be accessed is not yet present in the primary memory device.

7. A method of making accesses to a plurality of data present in a memory device, comprising the steps of:

providing an index having a data entry for each data which records an identifier of each data and a data position of each data in the memory device;

writing each data after an update into another position in the memory device different from a position of each data in the memory device before the updating; and validating the updating of each data by changing the data position of each data recorded in the data entry in the index provided at the providing step to said another position at which each data after the updating is written at the writing step.

8. The method of claim 7, further comprising the steps of:

accompanying each data with a data entry address indicating a position of the data entry for each data in the index provided at the providing step: and detecting an invalid data portion in the memory device by comparing the data position of each data in the writing block with the data position of each data recorded in the data entry in the index indicated by the data entry address accompanying each data, wherein at the writing step, each data after the updating is written into the invalid data portion in the memory device.

9. An apparatus for making accesses to a plurality of data comprising:

a secondary memory device having a plurality of blocks in which the data are present, and a primary memory device used for making accesses to the data in the secondary memory device;

selecting means for selecting one of said plurality of blocks as a writing block;

writing means for writing each updated data into a region in the primary memory device corresponding to an invalid data portion in the writing block selected by the selecting means; and storing means for storing the writing block with each updated written by the writing means from the primary memory device into the secondary memory device.

10. The apparatus of claim 9, wherein the selecting means selects one of said plurality of blocks which has a smallest number of valid data among said plurality of blocks as the writing block.

11. The apparatus of claim 9, wherein the selecting means selects one of said plurality of blocks which is already present in the primary memory device as the writing block.

12. The apparatus of claim 9, further comprising:

an index having a data entry for each data which records an identifier of each data and a data position of each data on the secondary memory device, wherein the writing means writes each updated data into another position in the primary memory device different from a position of each data in the secondary memory device before an updating of each data; and means for validating the updating of each data by changing the data position of each data recorded in the data entry in the index to said another position at which each updated data is written by the writing means while the writing block is stored by the storing means.

13. The apparatus of claim 12, wherein each data is accompanied with a data entry address indicating a position of the data entry for each data in the index, and the writing means detects the invalid data portion in the writing block selected by the selecting means by comparing the data position of each data in the writing block with the data position of each data recorded in the data entry in the index indicated by the data entry address accompanying each data.

14. The apparatus of claim 9, further comprising:

means for reading each data to be accessed from the secondary memory device to the primary memory device one data by one data, whenever said each data to be accessed is not present in the primary memory device.

15. An apparatus for making accesses to a plurality of data, comprising:

a memory device for storing said plurality of data;

an index having a data entry for each data which records an identifier of each data and a data position of each data in the memory device;

means for writing each data after an updating into another position in the memory device different from a position of each data in the memory device before the updating; and means for validating the updating of each data by changing the data position of each data recorded in the data entry in the index to said another position at which each data after the updating is written by the writing means.

16. The apparatus of claim 15, wherein each data is accompanied with a data entry address indicating a position of the data entry for each data in the index, and the writing means detects an invalid data portion in the memory device by comparing the data position of each data in the writing block with the data position of each data recorded in the data entry in the index indicated by the data entry address accompanying each data, and writes each data after the updating into the invalid data portion in the memory device.

17. The method of claim 1, wherein a buffer region is provided in the primary memory device on which the data stored on the secondary memory device are placed, the buffer region being shared among a plurality of threads;

the selecting step selects one of said plurality of blocks as a writing block for each thread; and the writing step writes each updated data by each thread into a region on the buffer region provided at the providing step corresponding to an invalid data portion in the writing block selected for each thread at the selecting step.

18. The apparatus of claim 9, wherein a buffer region is provided in the primary memory device on which the data stored on the secondary memory device are placed, the buffer region being shared among a plurality of threads;

the selecting means selects one of said plurality of blocks as a writing block for each thread; and the writing means writes each updated data by each thread into a region on the buffer region provided in the primary memory device corresponding to an invalid data portion in the writing block selected for each thread by the selecting means.

19. The method of claim 17, wherein at the writing step, each thread is permitted to write each updated data only into the writing block selected for each thread.

20. The method of claim 17, wherein at the storing step, a plurality of requests for writing with respect to the secondary memory device from a plurality of threads are processed in a sequential order, and a plurality of requests for writing with respect to a continuous region in the secondary memory device are processed together as a single writing operation with respect to the secondary memory device.

21. The apparatus of claim 18, wherein the writing means permits each thread to write each updated data only into the writing block selected for each thread.

22. The apparatus of claim 18, wherein the storing means processes a plurality of requests for writing with respect to the secondary memory device from a plurality of threads in a sequential order, and a plurality of requests for writing with respect to a continuous region in the secondary memory device together as a single writing operation with respect to the secondary memory device.

* * * * *